United States Patent

Shiokawa et al.

[11] Patent Number: 5,433,655
[45] Date of Patent: Jul. 18, 1995

[54] BALANCE ADJUSTMENT METHOD OF END MILL

[75] Inventors: Takeji Shiokawa; Kuninori Imai, both of Kanagawa; Chikakazu Ninomiya; Hideaki Sasaki, both of Hadano, all of Japan

[73] Assignee: Hitachi, Ltd., Tokyo, Japan

[21] Appl. No.: 151,168

[22] Filed: Nov. 12, 1993

[30] Foreign Application Priority Data

Nov. 12, 1992 [JP] Japan ................................. 4-302063

[51] Int. Cl.⁶ .................................................. B24B 1/00
[52] U.S. Cl. .................................... 451/48; 76/101.1; 76/108.6; 76/115; 407/54
[58] Field of Search .................... 451/488, 57, 28, 217, 451/220; 76/101.1, 108.6, 108.1, 108.2, 115; 407/53, 54

[56] References Cited

U.S. PATENT DOCUMENTS

| | | | |
|---|---|---|---|
| 3,514,828 | 6/1970 | Wale | 407/54 |
| 4,230,429 | 10/1980 | Eckle | 408/223 |
| 4,300,862 | 11/1981 | Yada | 407/53 |
| 4,889,456 | 12/1989 | Killinger | 408/224 |
| 4,968,195 | 11/1990 | Hayakawa et al. | 451/28 |
| 5,188,488 | 2/1993 | Nakayama et al. | 407/54 |
| 5,269,618 | 12/1993 | Meyer | 408/224 |

*Primary Examiner*—Bruce M. Kisliuk
*Assistant Examiner*—Derris H. Banks
*Attorney, Agent, or Firm*—Evenson McKeown Edwards & Lenahan

[57] ABSTRACT

A balance adjustment method of an end mill for increasing the accuracy of the machined surface and also for lengthening the tool lifetime, in which mass unbalance between an end gash part of a primary cutting edge and an end gash part of a secondary cutting edge of the end mill having asymmetric cutting parts is balanced by decreasing an end gash angle, an end gash part, a clearance angle or a corner of tooth face of the secondary cutting edge.

14 Claims, 4 Drawing Sheets

FIG.1B  FIG.1A
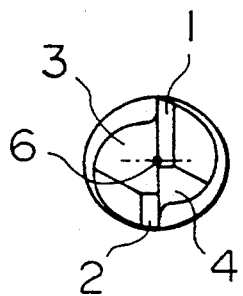
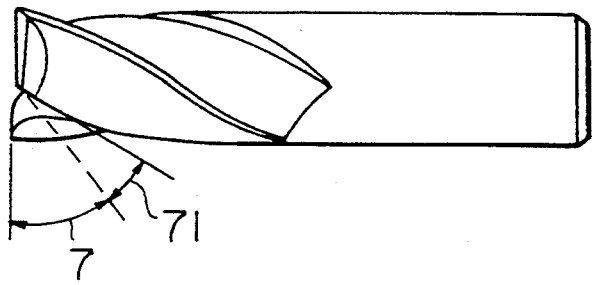
FIG.1C
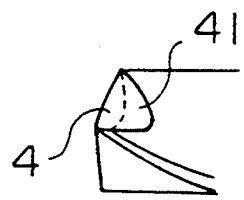
FIG.2B  FIG.2A
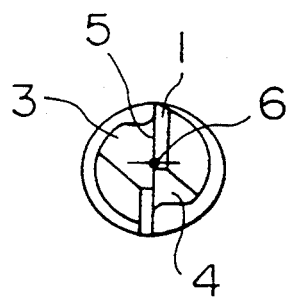
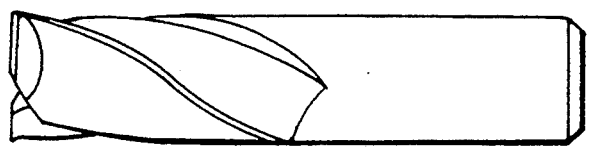

BALANCE ADJUSTMENT METHOD OF END MILL

BACKGROUND OF THE INVENTION

The present invention relates to a balance adjustment method of an end mill in an apparatus for cutting with the rotating end mill, such as a milling machine and a machining center, in which unbalance of the end mill having asymmetric cutting parts is adjusted to prevent movement dispersion and vibrations of cutting edges so as to increase the cutting efficiency and to enhance the machining accuracy and the surface roughness.

The machining accuracy required for a machining apparatus has been further enhanced in response to the progress of numerical control and the establishment of systems for correcting control of errors of the apparatus, temperature control and torque control.

However, due to an increase in the centrifugal force in accordance with a speed increase of a spindle (the rotational speed: 20,000 to 100,000 r.p.m.) in recent years, mass unbalance of an end mill having asymmetric cutting parts causes many phenomena conspicuously. For example, the unbalance induces vibration of a machining apparatus, deteriorates the roughness of a machined surface, and further, shortens the lifetime of the end mill by partial contacts of cutting edges, chipping generated by vibrations or the like.

As disclosed in "All about the End Mill" (published by Taiga Publishing Company on Jun. 1, 1988, p. 146), conventional configurations of asymmetric cutting parts are observed in two-, three-, four- and six-flute end mills. However, unbalance is generated in three types of these end mills, i.e., two-, three- and four-flute end mills.

An end mill having asymmetric cutting parts is designed in such a manner that one of a plurality of end cutting edges is shaped to extend over the center of revolution in order to improve the cutting efficiency of the central portion of revolution and to facilitate boring of a workpiece. This end cutting edge is called a primary cutting edge and the others are called secondary cutting edges in some cases. Generally, however, an end mill having such a configuration is called an end mill having asymmetric cutting parts.

This type of an end mill having asymmetric cutting parts is characterized in that the single end mill can perform both boring and machining of an inner peripheral surface, as observed in the case of grooving of a key groove. The number of cutting edges is selected in accordance with a material quality and a machining purpose. Usually, an end mill having a small number of cutting edges is used for rough machining, and the number of cutting edges is increased as the finishing accuracy is raised.

By use of a two-flute end mill having asymmetric cutting parts as an example, problems will be discussed with reference to FIGS. 2A and 2B. In this example, the longer end cutting edge is called an end cutting edge A and the shorter end cutting edge is called an end cutting edge B for the sake of convenience.

Of the two end cutting edges, the end cutting edge A 1 is shaped to extend over the center of revolution 6. Therefore, in order to obtain a tooth face 5 in this end of cutting part, an end gash part A 3 is lightened by a larger degree than an end gash part B 4.

When such an end mill having asymmetric cutting parts is rotated, the centrifugal force of the end gash part B becomes larger. As a result, the end mill is rotated in an unbalanced manner in this direction, and a degree of the unbalanced rotation is increased as the rotational speed is higher.

Especially when this end mill is used in a recent high-speed machining apparatus or the like, the degree of unbalanced rotation of the end mill is increased in proportion to the rotational speed. In consequence, even if a plurality of cutting edges are employed, cutting tends to be actually conducted by only one of them. In this case, the lifetime of the tool will be extremely shortened, and also, the machining accuracy and the surface roughness will be largely affected.

Moreover, whirling in the rotation owing to unbalance of the end mill causes a load more than necessary to be exerted on a spindle. Furthermore, vibration generated by the unbalanced rotation is apt to increase the roughness of the machined surface and the occurrence of chipping of cutting edges of the end mill.

SUMMARY OF THE INVENTION

The present invention has been achieved to solve the above-described problems and to provide an end mill whose lifetime is lengthened even if it is rotated at a high speed and which can perform machining with higher accuracy. Objects of this invention will be described as follows:

(1) Even in an apparatus with a spindle whose rigidity is relatively low, the tool is well-balanced, and vibration is not generated by the tool, so that machining can be performed relatively efficiently.

(2) A tool with a cutting edge made of cemented carbide or diamond is relatively weak to an impact, and chips easily. Such an impact induced by vibration or the like is suppressed.

(3) In the case of side-face machining by means of outer peripheral cutting edges, when the rotation is unbalanced, cutting tends to be conducted by only one cutting edge irrespective of the number of cutting edges, so that it is difficult to produce an effect of plural cutting edges. This drawback is solved.

(4) In the case of a high-speed machining apparatus, the degree of unbalanced rotation of the tool is increased in proportion to the rotational speed. The structure of the end mill which is adequately balanced during high-speed rotation is provided.

(5) By balancing the end mill, a work volume of each cutting edge is uniformed, so that the end mill can be used with the utmost efficiency.

In order to achieve the above objects, the mass balance is adjusted by the depth of a clearance angle part, an end gash part or a tooth face of the end cutting edge whose mass is larger. Thus, the end mill is balanced.

The end mill having asymmetric cutting parts includes a plurality of end cutting edges one of which is shaped to extend over the center of revolution, and an end gash part for forming this end cutting edge is lightened by a large degree. This condition causes unbalance of the mass. In order to solve the problem of unbalance, the present invention is characterized in that a part on the opposite side with respect to the axis of revolution is lightened by an amount equivalent to the unbalance, thereby balancing the end mill.

In the case of two- and four-flute end mills, for example, setting, at a large value, an end gash angle of an end gash part on the opposite side with respect to the axis of revolution to an end gash part which causes unbalance is a relatively easy method of balancing the end mill.

In the case of a three-flute end mill, preferably, masses of end gash parts defined by the other two cutting edges are dispersed to be uniform, and an end gash angle of each end gash part is enlarged.

Since the well-balanced end mill having asymmetric cutting parts which does not whirl in the rotation owing to unbalance manner can be thus obtained, there will be caused almost no errors between dimensions of a workpiece measured by a tool presetter and dimensions of the same at the time of actual machining, thereby enabling stable machining. Especially in a high-speed machining apparatus, even if an end mill of a relatively large diameter is employed, vibration is largely decreased because the well-balanced end mill having asymmetric cutting parts is used, and a load which has been observed in the conventional case is not applied to the spindle.

Moreover, since the rotation becomes for stable by reducing the unbalance, each cutting edge uniformly acts on the machined surface, to provide a favorable configuration of the machined surface. Especially because vibration due to the unbalance is not generated, the occurrence of chipping of cutting edges is prevented. Furthermore, cutting in severe conditions by only one cutting edge is not induced, thus lengthening the lifetime of the end mill.

BRIEF DESCRIPTION OF THE DRAWINGS

FIGS. 1A, 1B and 1C are diagrams showing one embodiment of a balance adjustment method according to the present invention;

FIGS. 2A and 2B are diagrams showing an end mill having asymmetric cutting parts to which this invention is applied;

DESCRIPTION OF THE PREFERRED EMBODIMENTS

The present invention will be hereinafter described in detail on the basis of the preferred embodiments. Although this description relates to a two-flute end mill as a typical end mill having asymmetric cutting parts which is often employed for general use, this invention is applicable to a tool having more cutting edges, such as a three-flute end mill and a four-flute end mill.

(Embodiment 1)

FIGS. 1A, 1B and 1C show a configuration of an end mill having asymmetric cutting parts according to the present invention. In accordance with a mass of an end gash part A 3 of the end mill, an end gash angle 7 of an end gash part B 4 is enlarged like an adjusted end gash angle 71 so as to decrease a difference between masses of the end gash parts, thereby balancing the masses.

This is an extremely simple method for mass-balancing the end mill.

Figure 3:
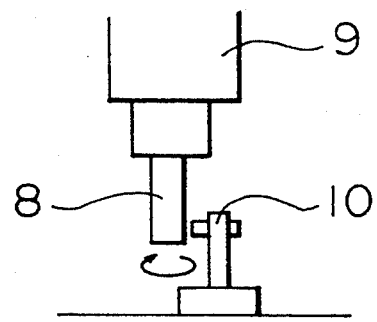
FIG. 3 is a diagram showing one embodiment of a balance measuring method according to the invention.

Balancing measurement was performed as follows: As shown in FIG. 3, a test bar 8 serving as a balance reference was prepared, fixed on the shaft of revolution 9 of the machining apparatus, and rotated in this state at 20,000 r.p.m. Then, a vibration property of the machining apparatus as a reference was measured by a measuring instrument of electrostatic capacity 10. Next, an end mill having asymmetric cutting parts which was not balanced was rotated similarly, and a vibration amount of this end mill was measured.

The measurement results showed that vibration of the end mill having asymmetric cutting parts was very large and several times larger than that of the test bar although it might vary because of properties of the apparatus.

End gash adjustment of the end gash part B was performed by a tool grinding machine. At first, since the amount of adjustment was not known, adjustment of a slight amount had to be conducted four or five times. In consequence, the vibration value of the adjusted end mill was successfully made close to that of the test bar.

Figure 4:
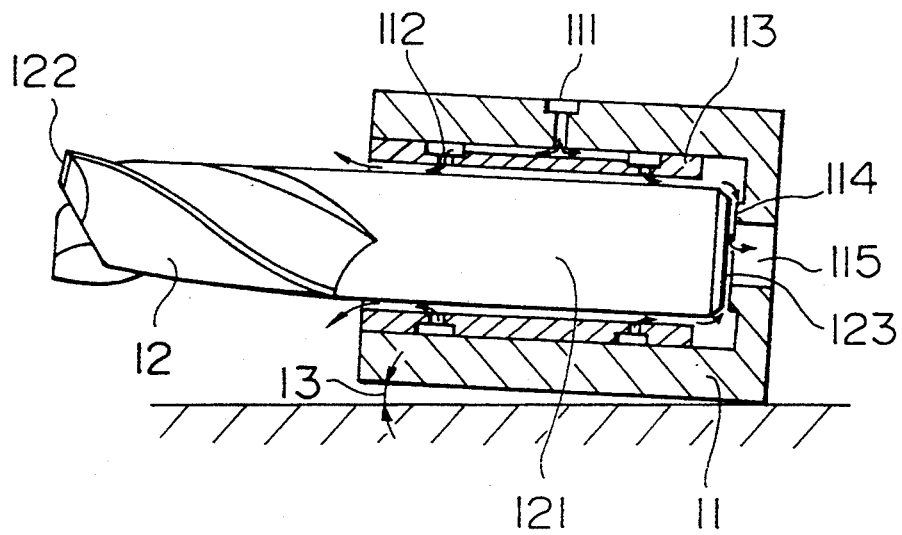
FIG. 4 is a diagram showing one embodiment of a balance measuring apparatus according to the invention.

Once an angle to be removed in the end gash angle was known, the subsequent operation would be relatively easy. However, because it was inconvenient to move the end mill between the machining apparatus for measuring vibration and the tool grinding machine for balancing, a simple radial pneumatic bearing shown in FIG. 4 was manufactured and employed as a simple balancer.

This radial pneumatic bearing 11 includes a formation part of radial pneumatic bearing 113 attached on an inner peripheral portion thereof. A shank part 121 of an end mill 12 having asymmetric cutting parts is inserted in this radial pneumatic bearing, floated by a pneumatic pressure and rotated manually. If there exists a mass unbalance, the end mill causes a pendulum movement and soon stops, with a heavy portion thereof staying on the lower side. On the other hand, if the end mill is well-balanced, it keeps rotating for a long time once a certain rotational force is exerted on it because it is a non-contact body. The end mill was balanced by utilizing this phenomenon, but the operation involved slight contrivance.

Firstly, a pneumatic bearing will be schematically described in a simple manner. A pneumatic bearing for general use has a radial pneumatic bearing gap of about 5 to 20 μm to increase the bearing rigidity. However, little rigidity of the bearing was required for the purpose of this embodiment. Therefore, a bearing was made to have a radial pneumatic bearing gap of about 30 μm so that the end mill could be inserted in and detached from the bearing easily.

A pneumatic pressure enough to float the end mill was supplied. In this embodiment, the pneumatic pressure was 2 kgf/square cm. This pneumatic pressure is introduced from an inlet port 111 and passed through orifices 112 so as to float the end mill 12 having asymmetric cutting parts radially in the formation part of radial pneumatic bearing 113. In this case, the air flows in both directions to a cutting portion 122 and an end face of shank 123. However, the pressure of the air which has flowed to the end face of shank 123 is not released into the atmosphere as it is, but it is used again at a formation part of thrust pneumatic bearing 114, to thereby float the end mill 12 having asymmetric cutting parts axially.

It should be noted that the radial pneumatic bearing is inclined slightly with an outlet port 115 staying on the lower side, because if the radial pneumatic bearing is placed on a horizontal plane, the end mill of asymmetric cutting part will dislodge from the radial pneumatic bearing.

An angle of inclination 13 can not be determined specifically because it varies according to an air-supply pressure, an area of the formation part of thrust pneumatic bearing and so forth. However, as the angle of inclination (about 2 to 15 degrees) was smaller, reaction with respect to the unbalance was more remarkable. For actual use, the angle of inclination was 5 degrees.

When machining was performed by means of the balance-adjusted end mill, the surface roughness Ra (centerline average height) was 0.2 to 0.3 $\mu$m, and was about ten times improved as compared with the surface roughness of Ra 2 $\mu$m when machining was performed by means of an end mill without balance adjustment.

Further, the lifetime of the end mill was two or three times longer, and the effect of balancing was confirmed.

(Embodiment 2)

Figure 5:
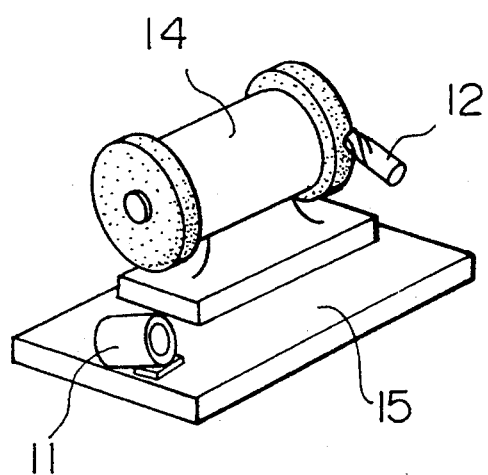
FIG. 5 is a diagram showing one embodiment of a balance adjustment method in which a double ended grinder is used according to the invention.

FIG. 5 shows a method of arbitrary lightening of an end gash part by means of a double ended grinder 14 irrespective of an end gash angle. Balancing was performed readily according to this method because the radial pneumatic bearing 11 serving as a balancer which had been developed in the present invention was beforehand set on a table for double ended grinder 15 so that the balance condition could be checked instantly.

When this method is employed, it is not necessary to prepare a large-sized apparatus such as a tool grinding machine.

(Embodiment 3)

Figure 6B:
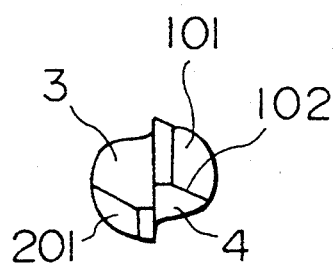
FIGS. 6A, 6B and 6C are diagrams showing another embodiment of a balance adjustment method according to the invention.
Figure 6A:
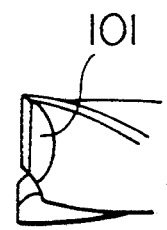
Figure 6C:
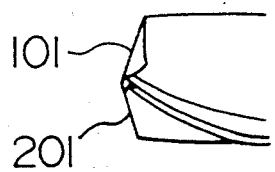

Adjustment of a clearance angle of end cutting edge is shown in FIGS. 6A, 6B and 6C. Balancing of a clearance angle 201 of end cutting edge B with respect to the end gash part A 3 was performed in the method described in Embodiments 1 and 2. As a result, although the balance was slightly improved, a portion where a clearance angle of end cutting edge A 101 intersected with the end gash part B 4, i.e., a portion in the vicinity of an outer peripheral corner 102, became heavy, so that balancing as favorable as machining of the end gash angle could not be effected.

Next, when lightening adjustment of the outer peripheral corner of this end mill was performed by means of a double ended grinder, accuracy similar to the results of Embodiments 1 and 2 was obtained. In this case, adjustment of the clearance angle of end cutting edge B and adjustment of an amount of lightening of the outer peripheral corner were important factors.

(Embodiment 4)

Figure 7B:
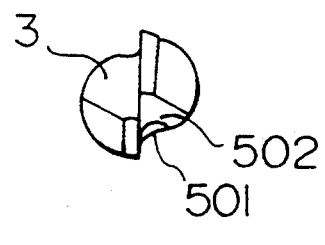
FIGS. 7A, 7B and 7C are diagrams showing a still other embodiment of a balance adjustment method according to the invention.
Figure 7A:
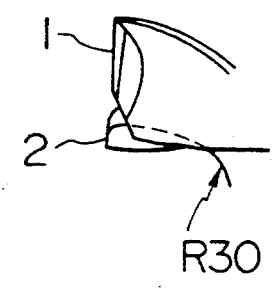
Figure 7C:
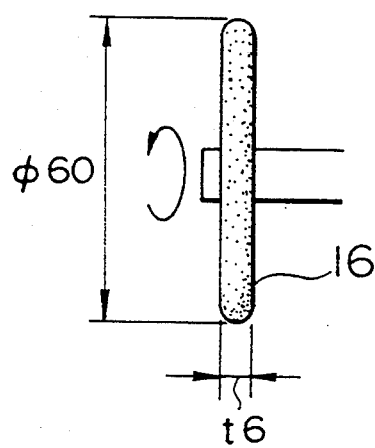

FIGS. 7A, 7B and 7C show a method in which an amount equivalent to an unbalanced amount of the end gash part A 3 is balanced by lightening of a portion of a corner of tooth face 501. In other words, it is a method of lightening by grooving a flute 502 in an arcuate portion of the corner of tooth face. Similarly to the above-described adjustment method by use of the end gash angle, balancing could be performed relatively easily.

This operation was carried out by a grinding wheel for fluting 16 ($\phi$60, t6). However, the invention is not limited to this size and configuration. Although the configuration is changed by the arcuate shape, the grindstone width or depth, balancing is realized by lightening so long as lightening is performed around this position. Alternatively, balancing may be realized by lightening in which the diameter of the arcuate portion of the corner of tooth face itself is decreased.

In the above-described embodiments, there have been described methods for adjusting and balancing the end mill having asymmetric cutting parts which has already been available on the market. When a well-balanced end mill having asymmetric cutting parts is considered from the stage of manufacturing it, not only balancing in one direction is performed, for example, not only the end gash angle is increased, as described in Embodiment 1 with reference to FIG. 1, but also the end gash angle of the end gash part A may be made smaller in advance.

That is to say, balancing is realized by adjusting one portion or a plurality of portions of the distal end of the end mill to such a degree as not to deteriorate configurations and rigidities of the outer peripheral cutting edges and the end cutting edges.

According to the present invention, the balance-adjusted end mill is employed so that vibration due to the rotation is extremely small, and that a vibration load more than necessary is not applied to the spindle, thereby obtaining stable rotational movement. As a result, there is caused little difference between dimensional values of a workpiece measured by a tool presetter and dimensional values of the same at the time of actual machining. Moreover, the roughness of the cut surface is remarkably favorable, and the feed rate can be made higher than that of the conventional end mill by 20%.

The lifetime of the cutting edge is twice or more longer. Besides, observation of a used end mill reveals that chipping or cracks which may have been observed in the conventional case are not generated, and that a favorable result is obtained.

What is claimed is:

1. A balance adjustment method of an end mill including a plurality of end cutting edges one of which is shaped to extend over the center axis of revolution, and end gash parts for forming tooth faces on the respective end cutting edges, wherein the mass balance of the end mill is adjusted to be uniform by lightening of an end gash part of an end cutting edge opposite to said end cutting edge which is shaped to extend over the center axis of revolution.

2. A balance adjustment method of an end mill according to claim 1, wherein said lightening is grinding of the end gash part of said end cutting edge opposite to said end cutting edge which is shaped to extend over the center axis of revolution by means of a tool grinding machine so as to increase an end gash angle of said end gash part.

3. A balance adjustment method of an end mill according to claim 1, wherein said lightening is grinding of the end gash part of said end cutting edge opposite to said end cutting edge which is shaped to extend over the center axis of revolution by means of a grinder.

4. A balance adjustment method of an end mill including a plurality of end cutting edges one of which is shaped to extend over the center axis of revolution, and end gash parts for forming tooth faces on the respective end cutting edges, wherein the mass balance of the end mill is adjusted to be uniform by lightening of a corner part of tooth face of an end cutting edge opposite to said end cutting edge which is shaped to extend over the center axis of revolution.

5. A balance adjustment method of an end mill according to claim 4, wherein said lightening is fluting for grooving a flute in said corner part of tooth face.

6. A balance adjustment method of an end mill according to claim 5, wherein said fluting is grinding of said corner part of tooth face by means of a fluting grindstone.

7. A balance adjustment method of an end mill including a plurality of end cutting edges one of which is shaped to extend over the center axis of revolution, and end gash parts for forming tooth faces on the respective end cutting edges, wherein the mass balance of the end mill is adjusted to be uniform by lightening of a clearance angle part of an end cutting edge opposite to said end cutting edge which is shaped to extend over the center axis of revolutions.

8. A balance adjustment method of an end mill according to claim 7, wherein said lightening is grinding of the clearance angle part of the end cutting edge opposite to said end cutting edge which is shaped to extend over the center axis of revolution by means of a tool grinding machine so as to increase a clearance angle of said clearance angle part.

9. A balance adjustment method of an end mill according to claim 7, wherein said lightening is grinding of the clearance angle part of the end cutting edge opposite to said end cutting edge which is shaped to extend over the center axis of revolution by means of a grinder.

10. A balance adjustment method of an end mill, wherein balance adjustment is performed by combining at least two of the balance adjustment methods of the end mill according to claims 1, 4 or 7.

11. A balance adjustment method according to claim 1, wherein the mass balance of the end mill is further adjusted to be uniform by lightening of a corner part of tooth face of an end cutting edge opposite to said end cutting edge which is shaped to extend over the center axis of revolution.

12. A balance adjustment method according to claim 1, wherein the mass balance of the end mill is further adjusted to be uniform by lightening of a clearance angle part of an end cutting edge opposite to said end cutting edge which is shaped to extend over the center axis of revolutions.

13. A balance adjustment method according to claim 11, wherein the mass balance of the end mill is further adjusted to be uniform by lightening of a clearance angle part of an end cutting edge opposite to said end cutting edge which is shaped to extend over the center axis of revolutions.

14. A balance adjustment method according to claim 4, wherein the mass balance of the end mill is further adjusted to be uniform by lightening of a clearance angle part of an end cutting edge opposite to said end cutting edge which is shaped to extend over the center axis of revolutions.

* * * * *